United States Patent Office 3,526,974
Patented Sept. 8, 1970

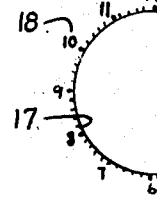

3,526,974
TEACHING DEVICE
Eunice M. Van Derveer and Earl B. Van Derveer, both of Box 68, Adelanto, Calif. 92301
Filed May 1, 1968, Ser. No. 726,647
Int. Cl. G09b 19/02
U.S. Cl. 35—31                          8 Claims

ABSTRACT OF THE DISCLOSURE

A teaching device includes an answer card which slides beneath an apertured problem sheet. In a problem-solving position, answers on the card are out of view beneath the sheet. In an answer-checking position the answers are visible through openings in the sheet. The card has an edge portion which projects beyond a corresponding edge portion of the sheet in the problem-solving position, and which is conveniently movable into alignment with the sheet edge portion to place the card in answer-checking position. Matching openings in the answer card provide for writing of answers through the sheet. The card is relatively movable between problem-sheet and card. The matching openings also provide for visual comparison of the written answers and correct answers when the card is in answer-checking position. The problem sheet has two timing openings through which the starting and finishing times may be recorded. Both the problem sheet and answer card have matching cut-outs providing fingerhold areas for convenient removal of the work sheet.

BRIEF SUMMARY OF THE INVENTION

This invention relates to teaching devices, and more particularly to an improved teaching device for children which includes an apertured problem sheet and an answer card supported for sliding movement beneath the problem sheet. The card is relatively movable between problem-solving and answer-checking positions and is provided with a projecting edge portion which can be conveniently moved into alignment with a corresponding edge portion of the problem sheet to place the parts in their answer-checking position.

The problem sheet has associated supporting means for the answer card and for an individual answer work sheet beneath the answer card. This supporting means is provided by forming the problem sheet as the upper or front face of a tubular folder within which the answer card is slidably supported. The folder is folded at the sides, and sealed at the back. The answer card slides in at either end, and is pushed up to an answer-checking position, to place answers into position for checking, and pushed down to a problem-solving position to place answers out of view.

In the answer-checking position, correct answers on the answer card are visible through problem openings or aperture portions of the problem sheet. Matching openings in the answer card provide for writing individual problem answers through aperture portions of the problem sheet and answer card onto a work sheet beneath the card, when the parts are in problem-solving position. Individual answers on such a work sheet and corresponding correct answers on the answer card are both visible through aperture portions of the problem sheet, when the parts are in answer-checking position. This teaching device gives the learner great convenience in studying with or without the answers.

A further feature is the provision of matching timing openings in the problem sheet and answer card. Clock face indicia are shown around the edges of two such openings for recording clock hand positions at the start and finish of the problems involved. The timing feature encourages the child to work for speed, as well as accuracy. The novelty of manipulating the device, encourages practice, which is so necessary for mastery of the basic facts.

It is very easily used as a timed test, by the teacher.

BRIEF DESCRIPTION OF DRAWINGS

In the drawings which accompany and form a part of this application,

FIG. 1 is an end elevational view of an improved teaching device according to the preferred embodiment of the invention;

FIG. 2 is a top plan view of the device of FIG. 1, with one corner partially cut away, and with the parts in problem-solving position.

DETAILED DESCRIPTION

Figure 3:
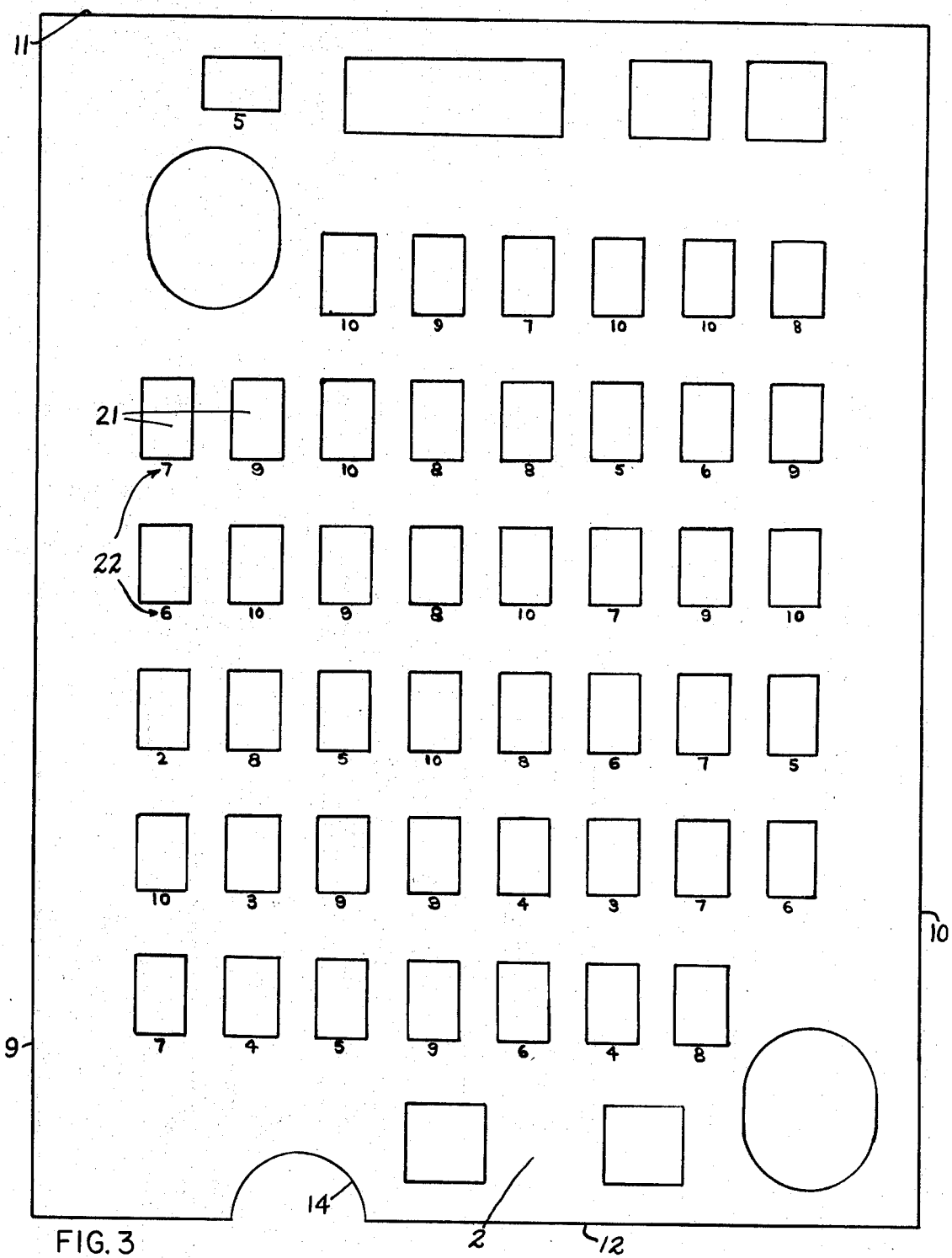
FIG. 3 is a top plan view of the answer card removed from the device of FIGS. 1 and 2.

A teaching device of new design, to train young children in basic education facts is shown in FIGS. 1 and 2.

It is manufactured from Manila tag, (.011 inch) and consists of two parts, a problem folder 1 and an answer sheet or card 2, as follows:

(1) A folder 1 measuring 8⅝" x 11", is sealed closed along the back, 1⅛" in from the left edge. Thus, the folder has front and back sheets 3 and 4 joined by parallel closed or folded over side edges 5 and 6, with open upper and lower end edges 7 and 8.

On the front face 3 of the folder, which serves as a problem sheet, there are 45 rectangular openings 15 punched out, each measuring ½" wide x ¾" high, evenly spaced in six rows.

Two timing openings in the form of circles 17 and 19, representing clocks, 1¼" diameter, are puched out. One is in the upper left corner and one in the lower right corner.

The back of the folder is solid surface and provides supporting means for both the answer card 2 and an individual answer work sheet as described below.

Individual folders will have mathematic problems, phonics and other appropriate educational facts, printed above each rectangle in a space ⅝" by approximately ½", as shown at 16.

The two timing circles have clock face numerals from 1 to 12 around each, as shown at 18 and 20, and may be used as self timing clocks. They will indicate the time the problems are begun and completed.

There are four other punched out rectangles located near the upper edge, to be used for writing the set number, name of child, month and day on an answer work sheet.

Two other rectangles near the bottom edge are for errors and time. The cut-out portion 13 in the lower edge of folder 1 and the matching cut-out 14 in answer card 2 provide a finger hold area at the bottom which permits convenient removal of the work sheet.

(2) An answer card 2, measuring 8½" x 11¼", is also manufactured from Manila tag (.011 inch), and has side edges 9 and 10 and top and bottom edges 11 and 12, as shown in FIG. 3. The card also has matching openings 21 corresponding to the problem openings 15 in the problem sheet 3 of folder 1. Thus, the user can write through the aligned openings or apertures 15 and 21 to record answers to problems 16 on an individual work sheet to be positioned beneath the answer card. Card 2, with its matching openings, is inserted into the folder and even with the top edge. Thus, in this problem-solving position, the upper edge portion 11 of card 2 is in alignment with the upper edge portion 7 of sheet 3 and folder 1. (See FIG. 1.) The answers to the corresponding problems of the folder, are printed in a ¼" margin, at the lower edge of each rectangle on the answer card, as shown at 22 in FIG. 3.

The answer card extends ¼" below the lower edge of the Folder in the problem-solving position of FIG. 1, and when moved upward so that lower edge portion 12 of card 2 is even with the lower edge 8 of the problem sheet 3 and folder 1, the answers will be shown just below the child's answers, i.e., within the lower ¼ inch portion of the problem apertures 15.

A work sheet of standard size paper (8½" x 11") is inserted between the answer card and back of the folder.

The set number, name, date, answers, time and errors are written on this page through the openings provided.

The clock openings are used for timing, by drawing a mark or arrow on the work sheet, at the position of the minute hand, as shown on the wall clock, when problems are started and completed.

This teaching device, as described in the foregoing specification, is for the purpose of encouraging children to learn basic education facts. It has the following functions, uses and advantages:

(1) Correct answers are quickly and conveniently accessible, for study, or for the child to check his own answers.

(2) Timing feature permits self competition, thus encouraging speed.

(3) The timing feature teaches the understanding, the purpose and the importance of time.

(4) Sliding the answer card up and down, within the folder, makes a game-like, motivating activity for the child.

(5) The answer openings are sufficiently large to allow for the larger writing of young children. It also allows sufficient space to push the correct answers up, directly under the child's answers, for very quick and convenient comparison.

(6) The answer card and work sheet are kept securely in place, by the closed sides of the folder.

(7) The finger-hold, permits convenient removal of the work sheet.

(8) The sealed folder, and individual openings, for each answers, provides greater durability for the folder.

(9) Folders and answer cards are quickly matched by set numbers.

Now, therefore, we claim:

1. A teaching device comprising a tubular folder having front and back sheets joined by closed parallel side edges and having upper and lower open ends, and an answer card supported within said folder for up and down sliding movement parallel to said side edges, said answer card having upper and lower end edge portions spaced longitudinally slightly farther apart than the upper and lower open ends of the folder for convenient movement of the answer card between a first position, in which the upper edge portion of the card is in alignment with the open upper end of the folder and the lower edge portion of the card projects downwardly beyond the open lower end of the folder, and a second position, in which the lower edge portion of the card is in alignment with the lower open end of the folder and the upper edge portion of the card projects upwardly beyond the upper open end of the folder, the answer card and the front sheet of the folder each having problem aperture portions which are in matching register with each other in one of said positions and through which problem answers may be written on an answer work sheet positioned within the folder behind the answer card, said answer card having correct answer indicia theeron closely adjacent to each problem aperture portion of the card at a location which is out of view beneath the front sheet in said one of said positions and which is visible through an aperture portion of the front sheet in the other of said positions.

2. A teaching device according to claim 1 in which the front sheet has visible problem indicia above each problem aperture portion and in which the location of each correct answer indicia on the answer card is out of view below the lower edge of the corresponding aperture portion of the front sheet when the upper edge portion of the answer card is in alignment with the upper open end of the folder, and in which the correct answer indicia are visible just above the lower edge of the corresponding aperture portion of the front sheet when the lower end portion of the answer card is in alignment with the lower open end of the folder.

3. A teaching device according to claim 2 in which the answers on the answer card extend only partially up into the problem apertures of the front sheet when the lower edge of the answer card is in alignment with the lower end of the folder.

4. A teaching device according to claim 1 in which the inside dimensions of said tubular folder correspond to a standard paper size for receiving and supporting a piece of such standard size paper within the folder as an answer work sheet behind the first and second sheets.

5. A teaching device comprising a first sheet, a second sheet directly behind the first sheet, means supporting the sheets for relative sliding movement of one sheet with respect to the other, in a plane parallel to the other sheet, between a first problem-solving position and a second answer-checking position, said first and second sheets each having apertures therein which have portions registering with each other in said problem-solving position and through which problem answers may be written on a separate individual answer sheet to be placed behind the first and second sheets, said second sheet having correct answer indicia thereon closely adjacent to each aperture at a location out of view beneath the first sheet in said problem-solving position, said answer indicia being located in areas on said second sheet which become visible through the corresponding apertures of the first sheet when said sheets are in answer-checking position, each of said sheets having corresponding manually accessible edge portions which are in alignment with each other in the answer-checking position, and one of which edge portions projects beyond the other edge portion in the problem-solving position, thereby providing convenient relative movement of the sheets from problem-solving position to answer-checking position in response to manual alignment of said edge portions.

6. A teaching device according to claim 5 in which the first and second sheets each have two matching circular timing apertures therein through which marks may be made on such an individual answer work sheet, said first sheet having clock face numerals around each circular aperture for recording clock hand positions at the start and finish of a problem test.

7. A teaching device according to claim 5 in which said supporting means comprises a folded over guide edge on said first sheet, within which a corresponding edge of said second sheet is supported for sliding movement parallel to said guide edge.

8. A teaching device according to claim 7 in which said first sheet is part of a tubular folder having two opposite closed sides providing folded over guide edges within which said second sheet slides.

References Cited

UNITED STATES PATENTS

| | | |
|---|---|---|
| 1,641,982 | 9/1927 | McDade. |
| 1,781,047 | 11/1930 | Bondeson. |
| 2,503,130 | 4/1950 | Poritz. |
| 2,789,370 | 4/1957 | Studebaker et al. |

WILLIAM H. GRIEB, Primary Examiner